(12) United States Patent  
Saito (10) Patent No.: US 8,925,847 B2  
(45) Date of Patent: Jan. 6, 2015

(54) SPINNING REEL

(71) Applicant: Shimano Inc., Sakai, Osaka (JP)

(72) Inventor: Kei Saito, Osaka (JP)

(73) Assignee: Shimano Inc., Osaka (JP)

( * ) Notice: Subject to any disclaimer, the term of this patent is extended or adjusted under 35 U.S.C. 154(b) by 60 days.

(21) Appl. No.: 13/866,206

(22) Filed: Apr. 19, 2013

(65) Prior Publication Data

US 2014/0077017 A1    Mar. 20, 2014

(30) Foreign Application Priority Data

Sep. 18, 2012  (JP) .................................. 2012-204827

(51) Int. Cl.  
*A01K 89/01* (2006.01)

(52) U.S. Cl.  
CPC ............. *A01K 89/0114* (2013.01); *A01K 89/01* (2013.01)  
USPC ............................ 242/311; 242/278; 242/279

(58) Field of Classification Search  
CPC .................................................. A01K 89/0114  
USPC .......................... 242/242, 278, 279, 311, 315  
See application file for complete search history.

(56) References Cited

U.S. PATENT DOCUMENTS

| 4,023,421 | A | * | 5/1977 | Berlier et al. ...................... 74/57 |
| 5,427,324 | A | * | 6/1995 | Kawashiro .................... 242/241 |
| 6,412,721 | B2 | * | 7/2002 | Kawabe et al. ............... 242/278 |
| 6,484,956 | B2 | * | 11/2002 | Kawabe et al. ............... 242/278 |
| 6,682,007 | B2 | * | 1/2004 | Noda et al. ..................... 242/241 |
| 6,874,717 | B2 | * | 4/2005 | Takikura et al. ............... 242/242 |
| 7,614,576 | B2 | * | 11/2009 | Ochiai et al. .................. 242/246 |
| 8,480,020 | B2 | * | 7/2013 | Ochiai et al. .................. 242/274 |
| 2002/0130209 | A1 | * | 9/2002 | Noda et al. .................... 242/279 |
| 2006/0231657 | A1 | * | 10/2006 | Morise .......................... 242/244 |
| 2007/0057105 | A1 | * | 3/2007 | Kitajima et al. .............. 242/241 |
| 2008/0290202 | A1 | * | 11/2008 | Ochiai et al. .................. 242/246 |
| 2010/0187346 | A1 | * | 7/2010 | Ochiai et al. .................. 242/242 |

FOREIGN PATENT DOCUMENTS

| JP | 4-49969 U | 4/1992 |
| JP | 5-34862 U | 5/1993 |
| JP | 2002-153177 A | 5/2002 |

OTHER PUBLICATIONS

European Search Report of corresponding EP Application No. 13 16 7958.1 dated Dec. 19, 2013.

* cited by examiner

*Primary Examiner* — Emmanuel M Marcelo  
(74) *Attorney, Agent, or Firm* — Global IP Counselors (57) ABSTRACT

A spinning reel basically includes a housing, an oscillating mechanism, a retaining member and a first bolt member. The oscillating mechanism includes a traverse camshaft that is disposed in inside of the housing and a slider that slides along the traverse camshaft. The retaining member is arranged at a rear side of the traverse camshaft to retain the traverse camshaft in the housing. The bolt member fixes the retaining member to the housing by being screwed into the housing. A part of the shaft portion of the first bolt member is arranged at a prescribed spacing from the slider in an orthogonal direction to a sliding direction of the slider while the slider slides to a rear end portion of the traverse camshaft.

8 Claims, 5 Drawing Sheets

SPINNING REEL

CROSS-REFERENCE TO RELATED APPLICATIONS

This application claims priority under 35 U.S.C. §119 to Japanese Patent Application No. 2012-204827, filed Sep. 18, 2012. The entire disclosure of Japanese Patent Application No. 2012-204827 is hereby incorporated herein by reference.

BACKGROUND

1. Field of the Invention

This invention generally relates to a spinning reel.

2. Background Information

There is a type of conventional spinning reel, which assembles the members and mechanisms that are disposed on the inside of the housing from the front side of the housing (refer to Japanese Laid-Open Utility Model Publication No. H04-49969). In this type of spinning reel (hereinafter referred to as a front assembly-type spinning reel), the rear end portion of the traverse camshaft is disposed more toward the front than the rear end portion of the spool shaft. Consequently, the housing is configured to be compact for the portion that covers the rear end portion of the traverse camshaft in the housing.

On the other hand, the traverse camshaft needs to be inserted from the front; hence, the front assembly-type spinning reel described in Japanese Laid-Open Utility Model Publication No. H04-49969 is difficult to assembly. In addition, carrying out a precise machining of the portion for accommodating the bearing that supports the rear end of the traverse camshaft is very difficult. Therefore, a spinning reel that assembles the members and mechanisms that are disposed on the inside of the housing from the rear side of the housing (hereinafter referred to as a rear assembly-type spinning reel) has been considered as described in Japanese Laid-Open Utility Model Patent Publication No. H05-34862.

SUMMARY

As in the front assembly-type spinning reel described above, making the housing compact even in the rear assembly-type spinning reel is necessary. However, in the rear assembly-type spinning reel, members (including the bolt members) for positioning the members and mechanisms and the bolt member or the like for attaching the lid member to the housing are disposed at the rear side of the housing. Consequently, providing, for example, an attachment portion (a protruded portion) to the rear portion of the housing is necessary in order to attach these members, which creates a difficulty in making the rear portion of the housing compact.

One object of the present invention is to address the problem described above by providing a spinning reel capable of making the rear portion of the housing compact.

The spinning reel according to a first aspect of the present invention is a spinning reel that reels out the fishing line to forward. This spinning reel comprises a housing, an oscillating mechanism, a retaining member and a first bolt member. The oscillating mechanism has a traverse camshaft and a slider. The traverse camshaft is disposed into the inside portion of the housing. The slider slides along the traverse camshaft. The retaining member is arranged at the rear side of the traverse camshaft to retain the traverse camshaft in the housing. The first bolt member fixes the retaining member to the housing by being screwed into the housing. A part of the shaft portion of the first bolt member is arranged at a prescribed spacing from the slider in an orthogonal direction to a sliding direction of the slider while the slider slides to a rear end portion of the traverse camshaft.

In this spinning reel, when the slider is positioned at the rear end portion of the traverse camshaft, at least one part of the shaft portion of the first bolt member is disposed to have a prescribed spacing from the slider in the orthogonal direction to the sliding direction of the slider. By arranging the first bolt member at the rear portion of the housing as described above, it is possible to attach the retaining member to the rear portion of the housing even if the attachment portion for attaching the first bolt member to the housing is not specially formed to the rear portion of the housing. Accordingly, the rear portion of the housing can be made compact in this spinning reel.

The spinning reel according to a second aspect of the present invention relates to the spinning reel according to the first aspect of the present invention in which the housing has a first section covering the slider, and a second section that is disposed between the rear end portion of the traverse camshaft and the retaining member. The first section protrudes more rearward than the second section while the slider is positioned at the rear end portion of the traverse camshaft.

In this spinning reel, the housing is formed so that the first section of the housing protrudes more towards the rear than the second section of the housing when the slider is positioned at the rear end portion of the traverse camshaft. Namely, the second section of the housing is formed more towards the front side than the first section of the housing. Accordingly, the rear portion of the housing can be made compact in the second section of the housing in this spinning reel.

The spinning reel according to a third aspect of the present invention relates to the spinning reel according to the first or second aspect of the present invention in which the first bolt member is screwed to a rear side of the housing.

In this spinning reel, the first bolt member is disposed at the rear portion of the housing as was described above by screwing the first bolt member into the housing from the rear side of the housing. Consequently, the first bolt member can be attached to the housing easily, and also, the rear portion of the housing can be made compact.

The spinning reel according to a fourth aspect of the present invention relates to the spinning reel according to the second or third aspect of the present invention and further comprises a lid member that is attached to the housing. The lid member is fixed to the housing at the first section of the housing by a second bolt member.

In this spinning reel, the lid member is fixed to the housing in the first section of the housing through the second bolt member. Consequently, the lid member can be fixed to the housing without forfeiting the compactness in the rear portion of the housing.

The spinning reel according to a fifth aspect of the present invention relates to the spinning reel according to the fourth aspect of the present invention in which the first bolt member and the second bolt member are screwed into the housing so that shaft portions of the first bolt member and the second bolt member extend in directions that cross each other.

In this spinning reel, the first bolt member and the second bolt member are screwed to the housing so that the extending direction of the shaft portion of the first bolt member and the extending direction of the shaft portion of the second bolt member cross each other. Consequently, the rear portion of the housing can be made compact since the head portion of the second bolt member does not protrude towards the rear side of the housing. The head portion of the first bolt member is disposed within the range of the difference in the level between the first section of the housing and the second section of the housing. Therefore, the head portion of the first bolt member does not hinder the rear portion of the housing from being made compact.

The spinning reel according to a sixth aspect of the present invention relates to the spinning reel according to any one of the first to the fifth aspects of the present invention and further comprises a cover member covering the first section and the second section.

In this spinning reel, a cover member that covers the first section and the second section is provided. In this spinning reel, the rear portion of the housing can be made compact as was described above. Therefore, the freedom in the design and idea for the cover member can be enhanced.

The present invention can provide a spinning reel capable of making the rear portion of the housing compact.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
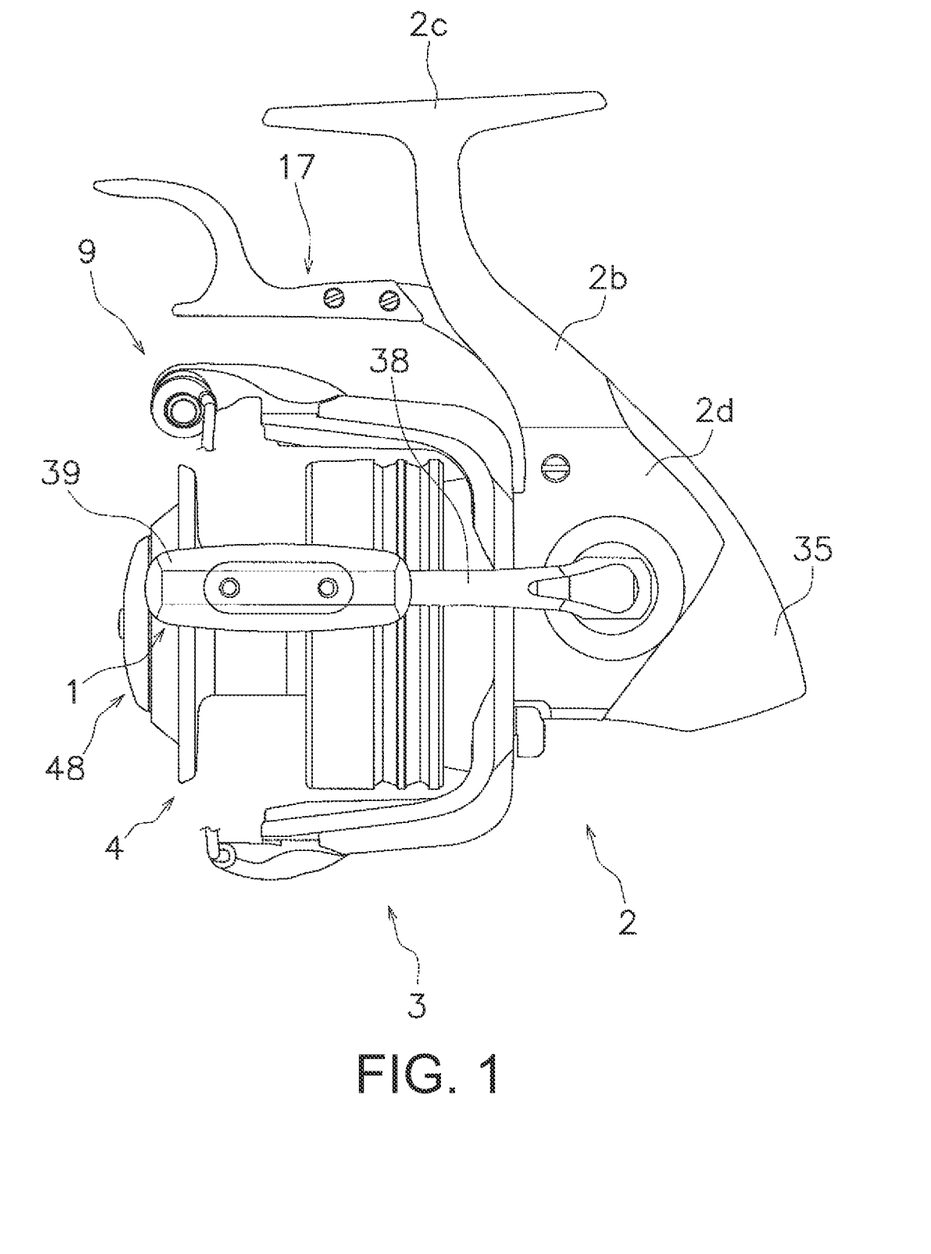
FIG. 1 is an outer side elevational view of a spinning reel in accordance with one embodiment of the present invention.

Referring initially to FIG. 1, a spinning reel is illustrated in accordance with a first embodiment. The spinning reel is a lever brake-type reel as illustrated in FIG. 1. The spinning reel comprises a reel main body 2, a handle assembly 1, a rotor 3 supported in a rotatable manner at the front portion of the reel main body 2, and a spool 4 for winding a fishing line disposed to the front portion of the rotor 3.

Figure 2:
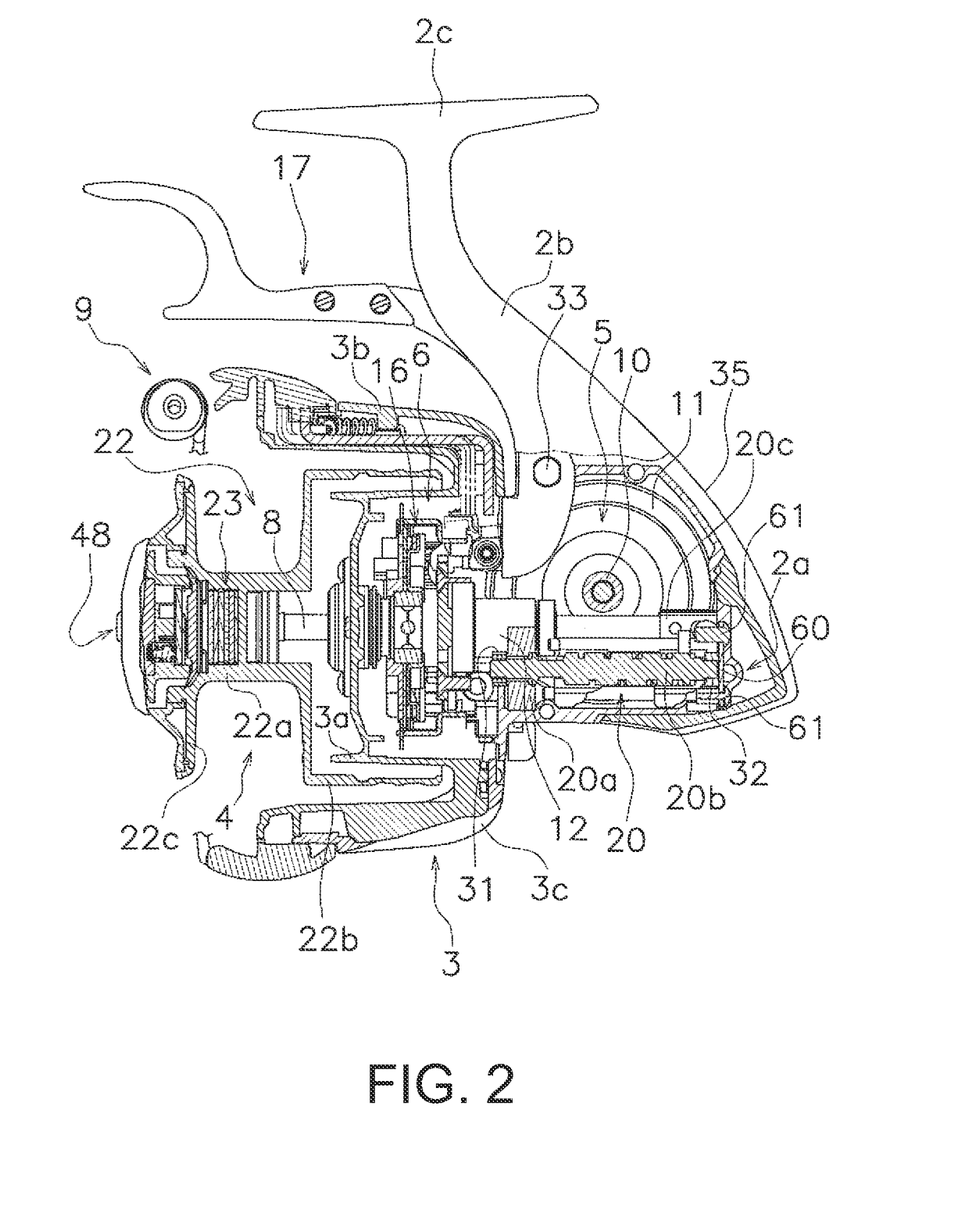
FIG. 2 is a first cross-sectional view of the spinning reel illustrated in FIG. 1 as taken along a vertical plane.
Figure 3:
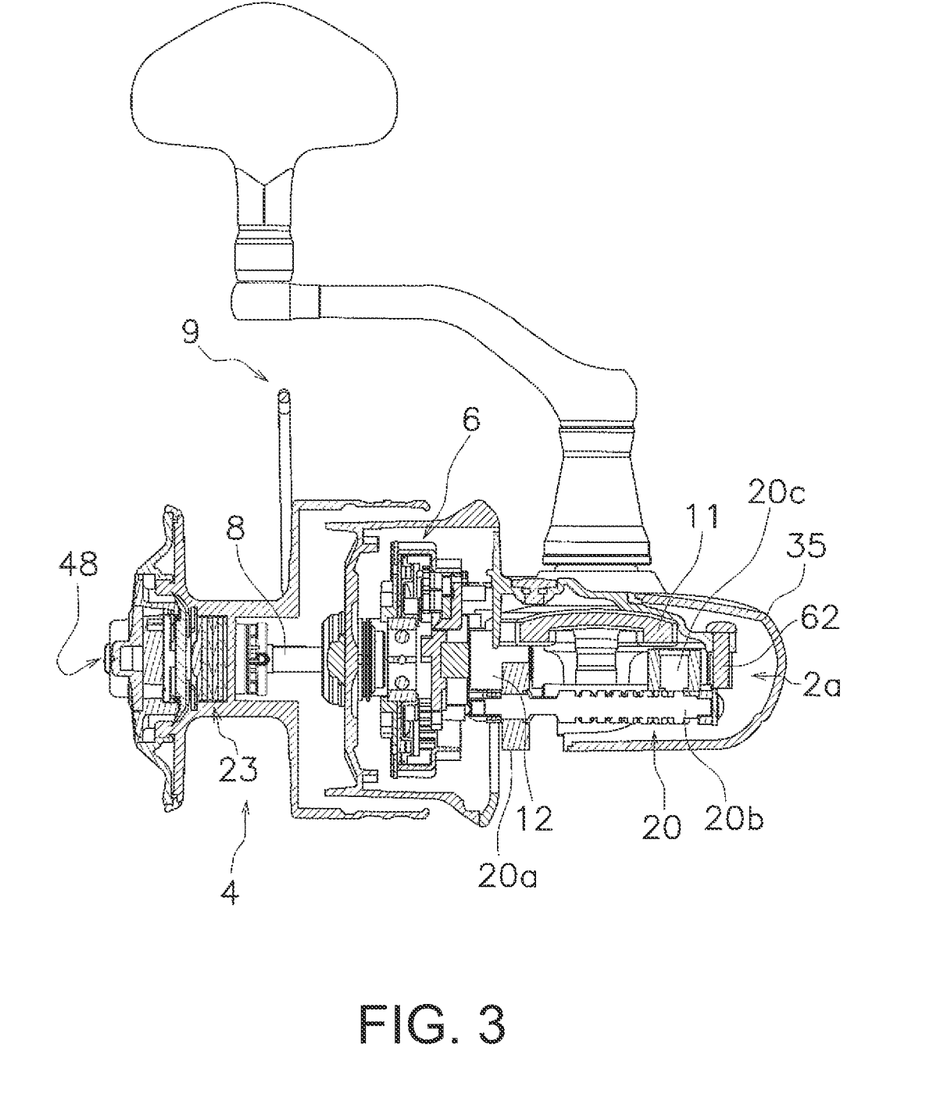
FIG. 3 is a second cross-sectional view of the spinning reel illustrated in FIG. 1 as taken along a horizontal plane.

The reel main body 2 is made, for example, from a magnesium alloy. As illustrated in FIGS. 1 to 3, the reel main body 2 has a reel body 2a, a leg portion 2b, a fishing rod attachment portion 2c and a lid member 2d. The reel body 2a is one example of a housing of the spinning reel. The leg portion 2b connects the fishing rod attachment portion 2c to the reel body 2a. The fishing rod attachment portion 2c is configured to be attached to a fishing rod in its longitudinal direction. The reel body 2a is arranged to form a space between the leg portion 2b and the reel body 2a. The lid member 2d covers the space formed by the reel body 2a. This space of the reel body 2a is used for housing and attaching mechanisms to the inside of the reel body More specifically, the reel body 2a is integrally formed to the leg portion 2b, and the side part is opened to the space of the reel body 2a. The opening in the reel body 2a is covered with the lid member 2d. The lid member 2d is fixed to the reel body 2a with a second bolt member 62. Specifically, the lid member 2d has an attachment portion 2e, and is fixed to the reel body 2a at this attachment portion 2e. The rear portion of the reel main body 2 is covered with a cover member 35 (one example of a cover member). A braking lever 17 is attached to the front surface of the leg portion 2b as discussed later.

The handle assembly 1 is a screw-in type that is screwed into a driving gear shaft 10 as illustrated in FIGS. 1 and 2. The handle assembly 1 comprises a screw shaft (not shown in the figures), a handle arm 38 and a handle grip 39. The screw shaft (not shown) is screwed into the driving gear shaft 10. The handle arm 38 is attached to the screw shaft in a foldable manner. The handle grip 39 is attached to a tip of the handle arm 38 for rotation around an axis that is parallel to the screw shaft.

A rotor drive mechanism 5, a lever brake mechanism 6, and an oscillating mechanism 20 are disposed in the inside portion of the reel body 2a as illustrated in FIGS. 2 and 3. The rotor drive mechanism 5 is a mechanism for rotating the rotor 3 in conjunction with the handle assembly 1. The lever brake mechanism 6 is a mechanism for braking the rotation (the reverse rotation) of the rotor 3 in the direction for reeling out the fishing line. The oscillating mechanism 20 is a mechanism for reciprocally moving the spool 4 back and forth through a spool shaft 8 in conjunction with the rotation of the handle assembly 1.

The rotor 3 is made, for example, from a magnesium alloy and is rotatably attached to the reel main body 2. The rotor 3 comprises a cylindrical portion 3a, a first arm portion 3b and a second arm portion 3c. The first arm portion 3b and the second arm portion 3c are disposed at the sides of the cylindrical portion 3a. while opposing each other. A through hole is formed at the center portion of the front wall of the cylindrical portion 3a. The spool shaft 8 has a pinion gear 12 that extends through this through hole. Also, a bail arm 9 is attached to a tip of the first arm portion 3b and to a tip of the second arm portion 3c in a manner that allows the bail arm to pivot. A fishing line is guided to the spool 4 by this bail arm 9.

The spool 4 is made, for example, from an aluminum alloy. The spool 4 is disposed between the first arm portion 3b and the second arm portion 3c of the rotor 3. The spool 4 is attached to a tip of the spool shaft 8 through a one-touch attaching/removing mechanism 48 to be attachable/removable and in a non-rotatable state. The spool 4 has a spool main body 22. The spool main body 22 comprises a cylindrical bobbin trunk 22a, a cylindrical skirt 22b and a flange 22c. The cylindrical skirt 22b is formed at the rear end portion of the bobbin trunk 22a. The cylindrical skirt 22b has a larger diameter than the bobbin trunk 22a. The flange 22c formed to the front portion of the bobbin trunk 22a at a forward tilt.

The rotor drive mechanism 5 comprises the driving gear shaft 10, a driving gear 11 and the pinion gear 12. The handle assembly 1 is fixed to the driving gear shaft 10 in an integrally rotatable state. The driving gear 11 rotates in conjunction with the driving gear shaft 10. The pinion gear 12 meshes with the driving gear 11 as illustrated in FIGS. 2 and 3. The driving gear shaft 10 has a cylindrical shape. The driving gear shaft 10 is integrally formed to the driving gear 11. The driving gear shaft 10 is disposed to the reel body 2a and the lid member 2d to be rotatable through a bearing (not shown in the figures).

The pinion gear 12 is formed into a cylindrical shape. The front portion of the pinion gear 12 is inserted through the through hole of the rotor 3 that was described above and extends to the spool 4 side of the rotor. At the front portion of the pinion gear 12, the rotor 3 is fixed to the pinion gear 12 in an integrally rotatable state. The pinion gear 12 is attached to the reel body 2a through a bearing (not shown in the figures) in a rotatable state.

The lever brake mechanism 6 comprises a braking portion 16 and a braking lever 17. The braking lever 17 is used for adjusting the braking force of the braking portion 16. The braking portion 16 is the portion that adjusts the braking force that applies a brake to the rotation (the reverse rotation) of the rotor 3 in the direction for reeling out the line. The braking lever 17 is attached to a support shaft 33 (refer to FIG. 2) in the leg portion 2b of the reel main body 2 to be able to pivot in the direction that crosses the extending direction of the spool shaft 8. The braking force of the braking portion 16 is adjusted by pivoting the braking lever 17.

The oscillating mechanism 20 is a traverse camshaft type as illustrated in FIGS. 2 and 3. The oscillating mechanism 20 comprises an intermediary gear 20a, a threaded shaft 20b (one example of a traverse camshaft), and a slider 20c. The intermediary gear 20a meshes with the pinion gear 12. The threaded shaft 20b is attached to the reel body 2a to be rotatable around an axis that is parallel to the spool shaft 8. Specifically, bearings 31 and 32 (refer to FIG. 2) are disposed at the two ends of the threaded shaft 20b. The threaded shaft 20b s supported to the reel body 2a through these bearings 31 and 32 to be rotatable around an axis that is parallel to the spool shaft 8. A retaining member 60 retains the threaded shaft 20b to the reel body 2a.

The slider 20c is attached to the rear end portion of the spool shaft 8 in a non-rotatable state and in a state incapable of moving in the axial direction. The slider 20c is moved back and forth along the threaded shaft 20b by the rotation of the threaded shaft 20b.

Detailed Configuration of the Rear Portion of the Reel Body

Figure 4:
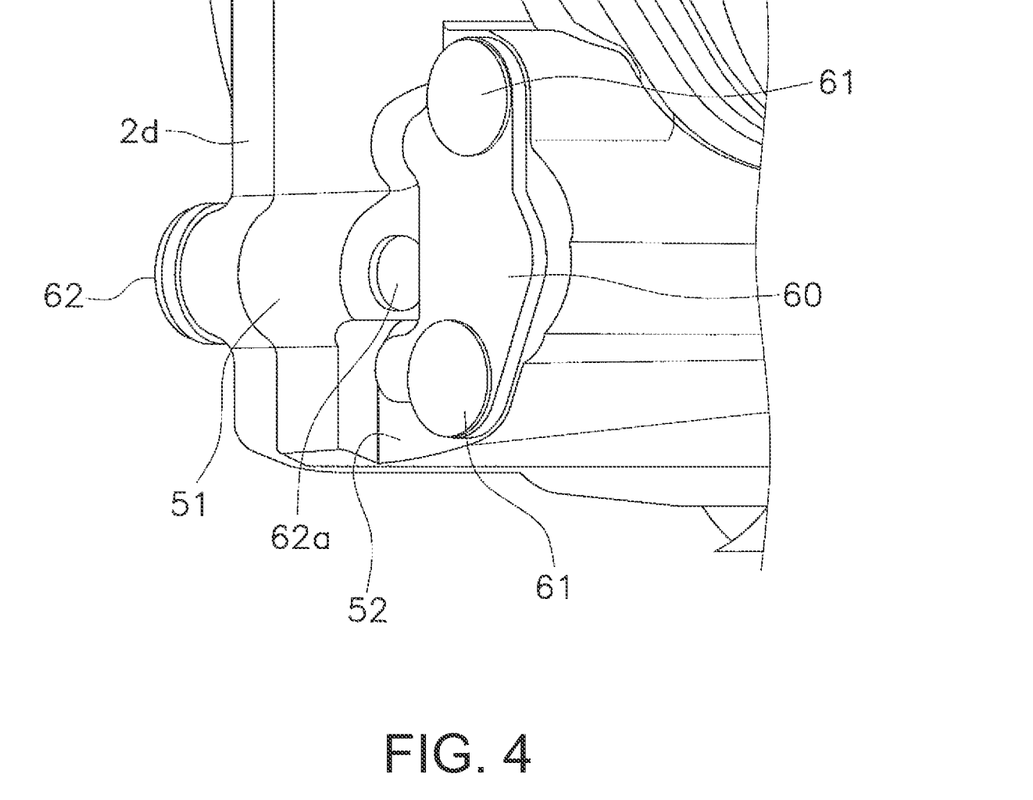
FIG. 4 is an outer perspective view of the rear portion of the reel body illustrated in FIG. 1.
Figure 5:
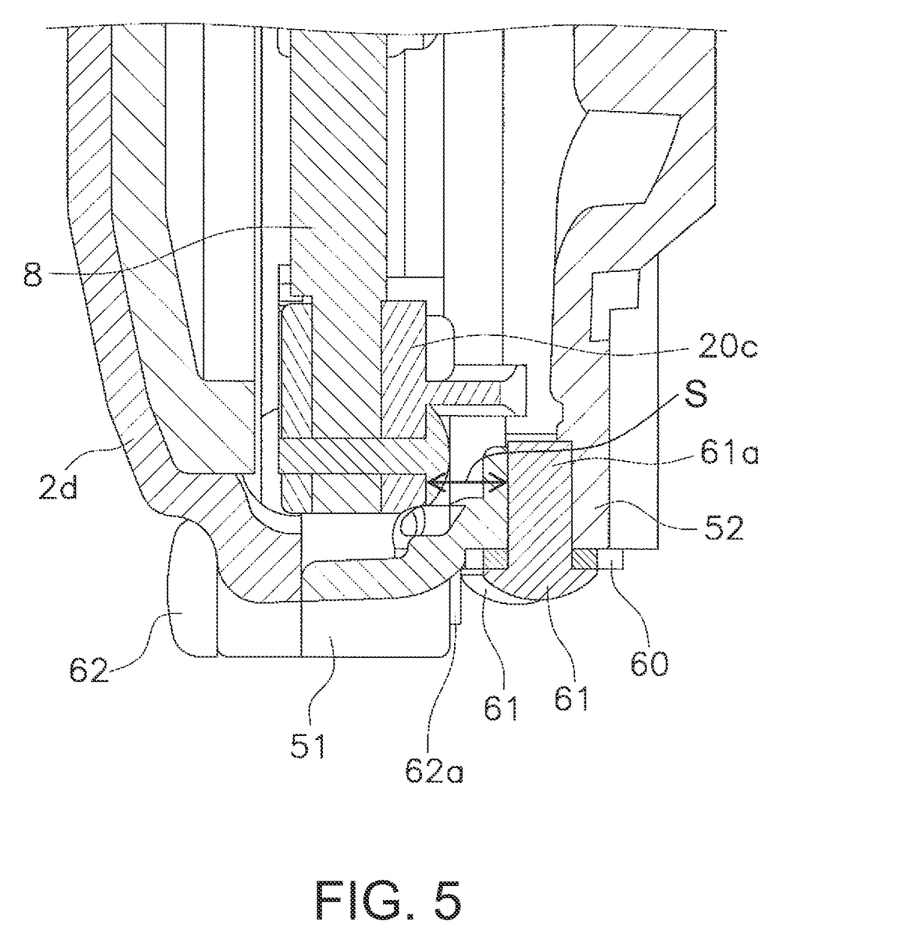
FIG. 5 is a cross-sectional view of the rear portion of the reel body illustrated in FIG. 1.

As illustrated in FIGS. 4 and 5, the rear portion of the reel body 2a comprises a first section 51 and a second section 52. The first section 51 is arranged at the rear side of the slider 20c. The second section 52 is arranged at the rear side of the threaded shaft 20b. The first section 51 of the reel body 2a and the second section 52 of the reel body 2a are integrally formed. The rear portion of the reel body 2a is formed so that the first section 51 of the reel body 2a protrudes more towards the rear than the second section 52 of the reel body 2a.

The first section 51 of the reel body 2a is the section that covers the slider 20c. The first section 51 of the reel body 2a is disposed at the rear side of the slider 20c. The lid member 2d is fixed to the first section 51 of the reel body 2a through the second bolt member 62. The second bolt member 62 has a shaft portion and a head portion. The shaft portion has a male threaded portion on the outer circumference. The head portion is formed to have a larger diameter than the shaft portion.

Specifically, the lid member 2d is attached to the first section 51 of the reel body 2a at the attachment portion 2e. More specifically, the attachment portion 2e of the lid member 2d is interposed between the head portion of the second bolt member 62 and the first section 51 of the reel body 2a by screwing the shaft portion 62a of the second bolt member 62 to the first section 51 of the reel body 2a.

The second section 52 of the reel body 2a is disposed at the rear side of the threaded shaft 20b. Also, the second section 52 of the reel body 2a is arranged between the rear end portion of the threaded shaft 20b and the retaining member 60. The retaining member 60 is disposed in the second section 52 of the reel body 2a. Specifically, the retaining member 60 is disposed on the outer circumferential surface of the second section 52 of the reel body 2a.

The retaining member 60 is formed into an oblong plate. Holes are formed at the two end portions of the retaining member 60 for receiving first bolt members 61. The retaining member 60 retains the threaded shaft 20b in the area between the two holes. Specifically, the retaining member 60 retains the threaded shaft 20b in conjunction with the bearing 32 (refer to FIG. 2). The first bolt members 61 each have a shaft portion and a head portion. The shaft portion has a male threaded portion on the outer circumference. The head portion is formed to have a larger diameter than the shaft portion.

The retaining member 60 is disposed in the reel body 2a at the rear side of the threaded shaft 20b. The retaining member 60 is fixed to the reel body 2a with the first bolt members 61. The retaining member 60 is fixed to the second section 52 of the reel body 2a with the two first bolt members 61. Each first bolt member 61 is screwed to the second section 52 of the reel body 2a from the rear side of the reel body 2a.

The first section 51 of the reel body 2a and the second section 52 of the reel body 2a are covered with a guard member 35. Specifically, the first section 51 of the reel body 2a and the second section 52 of the reel body 2a are covered with the guard member 35 in a state wherein the lid member 2d has been fixed to the first section 51 of the reel body 2a.

Here, the attachment position of each of the first bolt members 61 will be explained. As seen in FIG. 5, when the slider 20c is positioned at the rear end portion of the threaded shaft 20b, at least one part of the shaft portion 61a of the first bolt member 61 is positioned with a prescribed spacing S from the slider 20c in the orthogonal direction with respect to the sliding direction of the slider 20c. In other words, while the slider 20c slides to a rear end portion of the threaded shaft 20b, as seen in FIG. 5, a part of the shaft portion 61a of the first bolt member 61 and the slider 20c overlap in the sliding direction of the slider 20c with the prescribed spacing S between the shaft portion 61a of the first bolt member 61 and the slider 20c. More specifically, the first bolt member 61 is disposed in the reel body 2a so that a part of the slider 20c substantially overlaps a part of the shaft portion 61a of the first bolt member 61 while the slider 20c slides to the rear end portion of the threaded shaft 20b as observed from the orthogonal direction with respect to the sliding direction of the slider 20c.

Also, the positional relationship between the first bolt member 61 and the second bolt member 62 will be explained. The first bolt member 61 and the second bolt member 62 are attached to the reel body 2a so that the first direction towards which the shaft portion 61a of the first bolt member 61 extends and the second direction towards which the shaft portion 62a of the second bolt member 62 extends cross each other. Specifically, the first bolt member 61 and the second bolt member 62 are attached to the reel body 2a so that the first direction and the second direction cross each other substantially at a right angle. Also, the first bolt member 61 is attached to the reel body 2a (at the second section 52) so that the first direction is parallel to an attachment surface formed between the attachment portion 2e of the lid member 2d and in the first portion 51 of the reel body 2a. Also, the second bolt member 62 is attached to the reel body 2a (at the first section 51) so that the first direction is orthogonal to the attachment surface. Specifically, the first direction and the second direction are the extending directions of the axes of the shaft portions 61a and 62a.

(1) This spinning reel is a spinning reel that reels a fishing line out forward. This spinning reel comprises a reel body 2a, an oscillating mechanism 20, a retaining member 60, and a first bolt member 61. The oscillating mechanism 20 has a threaded shaft 20b and a slider 20c. The threaded shaft 20b is attached to the inside portion of the reel body 2a. The slider 20c slides along the threaded shaft 20b. The retaining member 60 is disposed at the rear side of the threaded shaft 20b and retains the threaded shaft 20b. The first bolt member 61 fixes the retaining member 60 to the reel body 2a by being screwed to the reel body 2a. When the slider 20c is positioned at the rear end portion of the threaded shaft 20b in a state wherein the first bolt member 61 has been screwed to the reel body 2a, at least one part of the shaft portion 61a of the first bolt member 61 is disposed with a prescribed spacing from the slider 20c in the orthogonal direction to the sliding direction of the slider 20c. In this spinning reel, when the slider 20c is positioned at the rear end portion of the threaded shaft 20b, at least one part of the shaft portion 61a of the first bolt member 61 is disposed with a prescribed spacing from the slider 20c in the direction orthogonal to the sliding direction of the slider 20c. By arranging the first bolt member 61 at the rear portion of the reel body 2a as described above, the retaining member 60 can be attached to the rear portion of the reel body 2a even if an attachment portion 2e for attaching the first bolt member 61 to the reel body 2a is not formed specially at the rear portion of the reel body 2a. Accordingly, the rear portion of the reel body 2a can be made compact in the present spinning reel.

(2) In this spinning reel, the first section 51 of the reel body 2a protrudes more towards the rear than the second section 52 of the reel body 2a when the slider 20c is positioned at the rear end portion of the threaded shaft 20b. The first section 51 of the reel body 2a is the section that covers the slider 20c in the reel body 2a. The second section 52 of the reel body 2a is the section that is disposed between the rear end portion of the threaded shaft 20b and the retaining member 60 in the reel body 2a. In this spinning reel, the reel body 2a is formed so that the first section 51 of the reel body 2a protrudes more towards the rear than the second section 52 of the reel body 2a when the slider 20c is positioned at the rear end portion of the threaded shaft 20b. Namely, the second section 52 of the reel body 2a is formed more towards the front side than the first section 51 of the reel body 2a. Accordingly, the rear portion of the reel body 2a can be made compact in the second section 52 of the reel body 2a in the present spinning reel.

(3) In this spinning reel, the first bolt member 61 is screwed to the reel body 2a from the rear side of the reel body 2a. In this spinning reel, the first bolt member 61 is arranged at the rear portion of the reel body 2a as was described above by screwing the first bolt member 61 to the reel body 2a from the rear side of the reel body 2a. Consequently, the first bolt member 61 can be attached to the reel body 2a easily, and also, the rear portion of the reel body 2a can be made compact.

(4) This spinning reel is provided additionally with a lid member 2d that is attached to the reel body 2a. The lid member 2d is fixed to the reel body 2a at the first section 51 of the reel body 2a through a second bolt member 62. In this spinning reel, the lid member 2d is fixed to the reel body 2a in the first section 51 of the reel body 2a through a second bolt member 62. Consequently, the lid member 2d is fixed to the reel body 2a without forfeiting the compactness in the rear portion of the reel body 2a.

(5) In this spinning reel, the first bolt member 61 and the second bolt member 62 are screwed to the reel body 2a so that the direction towards which the shaft portion 61a of the first bolt member 61 extends and the second direction towards which the shaft portion 62a of the second bolt member 62 extends cross each other. In this spinning reel, the first bolt member 61 and the second bolt member 62 are screwed to the reel body 2a so that the first direction and the second direction cross each other. Consequently, the head portion of the second bolt member 62 does not protrude towards the rear side of the reel body 2a, and the rear portion of the reel body 2a can be made compact. The head portion of the first bolt member 61 is disposed. within the range of the difference in the level between the first section 51 of the reel body 2a and the second section 52 of the reel body 2a. Therefore, the head portion of the first bolt member 61 does not hinder making the rear portion of the reel body 2a compact.

(6) This spinning reel is provided additionally with a guard member 35 that covers the first section 51 and the second section 52. In this spinning reel, a guard member 35 that covers the first section 51 and the second section 52 is also provided. In this spinning reel, the rear portion of the reel body 2a can be made compact as was described above. Therefore, the freedom in the design and idea for the cover member 35 can be enhanced.

Other Embodiments

A preferred embodiment of the present invention was explained above. However, the present invention is not restricted to the embodiment that was described above, and various modifications are possible in a scope that does not deviate from the scope of the present invention.

In the embodiment described above, an example of attaching the first bolt member 61 and the second bolt member 62 to the reel body 2a so that the first direction and the second direction substantially cross each other at a right angle was shown. It is possible instead to attach the first bolt member 61 and the second bolt member 62 to the reel body 2a so that the first direction and the second direction cross each other at an angle other than at a right angle.

What is claimed is:

1. A spinning reel a reels out a fishing line to forward, the spinning reel comprising:
   a housing;
   an oscillating mechanism including a traverse camshaft that is disposed in inside of the housing and a slider that slides along the traverse camshaft;
   a retaining member arranged at a rear side of the traverse camshaft to retain the traverse camshaft in the housing; and
   a first bolt member fixing the retaining member to the housing by being screwed into the housing, a part of a shaft portion of the first bolt member being arranged at a prescribed spacing from the slider in an orthogonal direction to a sliding direction of the slider while the slider slides to a rear end portion of the traverse camshaft,
   the housing having a first section covering the slider, and a second section disposed between the rear end portion of the traverse camshaft and the retaining member, and the first section protruding more rearward than the second section.

2. The spinning reel according to claim 1, wherein
   the first bolt member is screwed into a rear side of the housing.

3. The spinning reel according to claim 2, further comprising
   a lid member attached to the housing, and
   the lid member being fixed to the housing at the first section of the housing by a second bolt member.

4. The spinning reel according to claim 3, wherein
   the first bolt member and the second bolt member are screwed into the housing so that shaft portions of the first bolt member and the second bolt member extend in directions that cross each other.

5. The spinning reel according to claim 1, further comprising
   a lid member attached to the housing, and
   the lid member being fixed to the housing at the first section of the housing by a second bolt member.

6. The spinning reel according to claim 5, wherein
the first bolt member and the second bolt member are screwed into the housing so that shaft portions of the first bolt member and the second bolt member extend in directions that cross each other.

7. The spinning reel according to claim 1, further comprising
a cover member covering the first section and the second section.

8. The spinning reel according to claim 1, wherein
a part of the slider substantially overlaps the part of the shaft portion of the first bolt member as observed from the orthogonal direction with respect to the sliding direction of the slider while the slider slides to the rear end portion of the traverse camshaft.

* * * * *